US012664089B2

(12) United States Patent
Tarquinio et al.

(10) Patent No.: US 12,664,089 B2
(45) Date of Patent: Jun. 23, 2026

(54) GENERATING STUB OBJECTS WITH METADATA REFERENCING UPLOAD PARTS OF MULTI-PART UPLOAD OBJECT

(71) Applicant: Dell Products, L.P., Round Rock, TX (US)

(72) Inventors: Brandon Tarquinio, Seattle, WA (US); Micah Priddis, Silverdale, WA (US)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 18/424,307

(22) Filed: Jan. 26, 2024

(65) Prior Publication Data
US 2025/0245150 A1     Jul. 31, 2025

(51) Int. Cl.
*H04L 12/24* (2006.01)
*G06F 12/02* (2006.01)
*H04L 41/0803* (2022.01)
*H04L 67/1097* (2022.01)

(52) U.S. Cl.
CPC ...... *G06F 12/0253* (2013.01); *H04L 67/1097* (2013.01); *G06F 2212/702* (2013.01)

(58) Field of Classification Search
CPC ........... G06F 12/0253; G06F 2212/702; H04L 67/1097
USPC ....................................................... 709/226
See application file for complete search history.

(56) References Cited

U.S. PATENT DOCUMENTS

| 10,992,768 | B1 * | 4/2021 | Bhatnagar | H04L 67/568 |
| 11,671,492 | B2 * | 6/2023 | Yonekura | H04L 67/06 |
| | | | | 709/217 |
| 2016/0259808 | A1 * | 9/2016 | Miwa | H04W 4/029 |
| 2018/0034892 | A1 * | 2/2018 | Olsen | G06F 16/17 |
| 2019/0080288 | A1 * | 3/2019 | Daniels | G06F 3/04817 |
| 2019/0215358 | A1 * | 7/2019 | Kobayashi | H04L 67/1097 |
| 2021/0374157 | A1 * | 12/2021 | Reddy | G06F 16/275 |
| 2021/0396894 | A1 * | 12/2021 | Taylor | G01T 1/29 |
| 2022/0078236 | A1 * | 3/2022 | Yonekura | G06F 16/182 |
| 2022/0147448 | A1 * | 5/2022 | Zhang | G06F 12/0261 |

OTHER PUBLICATIONS

"Amazon S3 multipart upload limits" [https://docs.aws.amazon.com/AmazonS3/latest/userguide/qfacts.html] retrieved Apr. 26, 2024, 2 pages.

(Continued)

*Primary Examiner* — Moustafa M Meky
*Assistant Examiner* — Elizabeth Kassa
(74) *Attorney, Agent, or Firm* — Amin, Turocy & Watson, LLP

(57) ABSTRACT

The technologies described herein are generally directed toward generating a stub object with metadata referencing uploaded parts of a multipart upload object. In an embodiment, a method can include receiving a multipart upload object comprising references to upload parts. Further, the method can include, based on the multipart upload object being predicted to be subject to spillover during creation of the multipart upload object according to the upload parts, identifying the upload parts referenced by the multipart upload object, resulting in identified upload parts. The method can further include generating a stub object with metadata referencing the identified upload parts of the multipart upload object.

20 Claims, 11 Drawing Sheets

(56) References Cited

OTHER PUBLICATIONS

"Uploading and copying objects using multipart upload in Amazon S3" [https://docs.aws.amazon.com/AmazonS3/latest/userguide/mpuoverview.html] retrieved Apr. 26, 2024, 13 pages.

* cited by examiner

```
while offset < N:

offset = 0
i = 0

// Loop until the part that contains Nth Byte is identified while offset < N:
    offset += partSizeList(i++)

// Save the partNumber and the startingOffset in the object for
// the identified Nth Byte part startingPartNumber = partNumberList(i)
startingOffset = offset // Loop until the part that contains the Mth Byte is identified while offset < M:
    offset += partSizeList(i++)

// Save the identified Mth Byte part endingPartNumber = partNumberList(i)
```

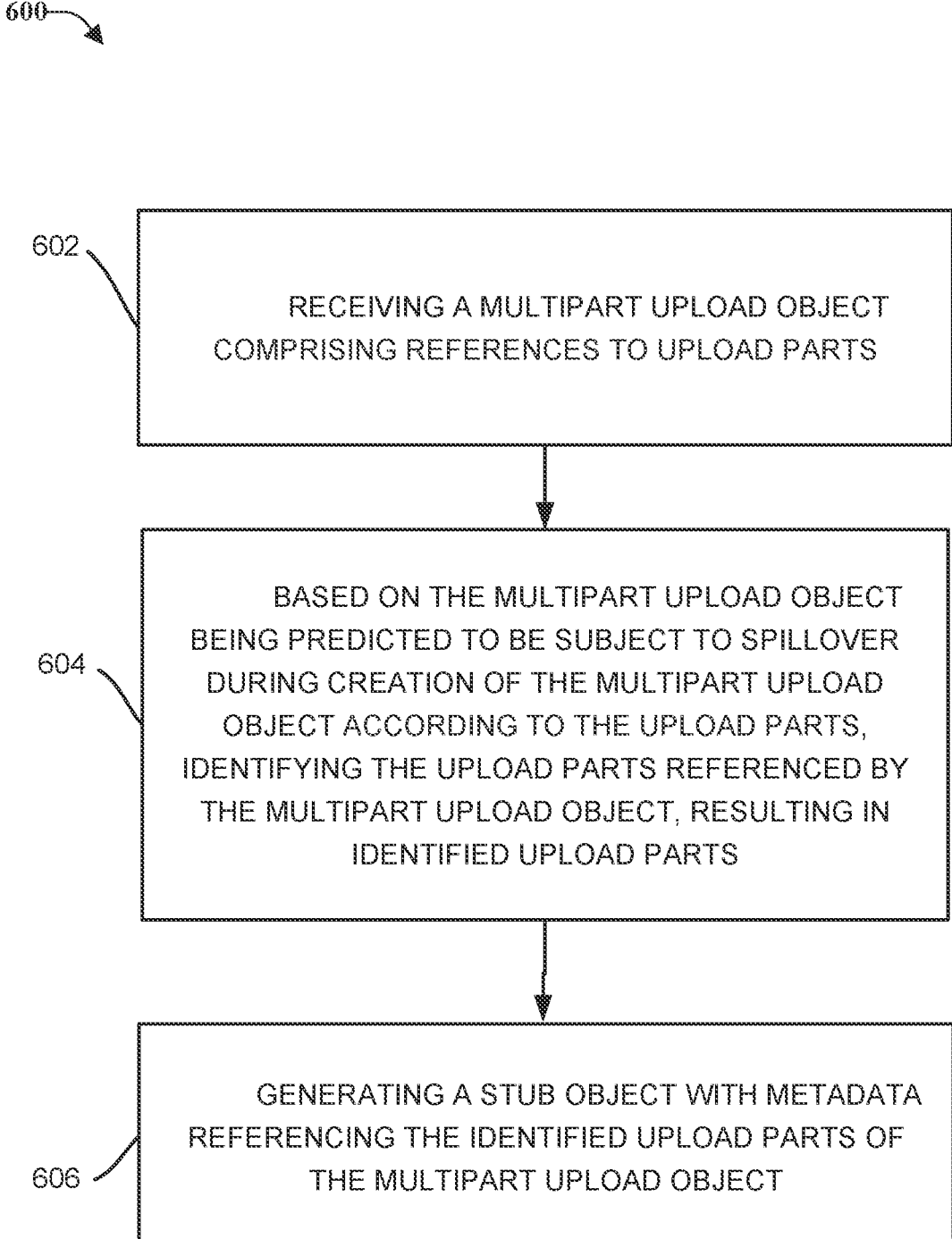

600

602

RECEIVING A MULTIPART UPLOAD OBJECT
COMPRISING REFERENCES TO UPLOAD PARTS

604

BASED ON THE MULTIPART UPLOAD OBJECT
BEING PREDICTED TO BE SUBJECT TO SPILLOVER
DURING CREATION OF THE MULTIPART UPLOAD
OBJECT ACCORDING TO THE UPLOAD PARTS,
IDENTIFYING THE UPLOAD PARTS REFERENCED BY
THE MULTIPART UPLOAD OBJECT, RESULTING IN
IDENTIFIED UPLOAD PARTS

606

GENERATING A STUB OBJECT WITH METADATA
REFERENCING THE IDENTIFIED UPLOAD PARTS OF
THE MULTIPART UPLOAD OBJECT

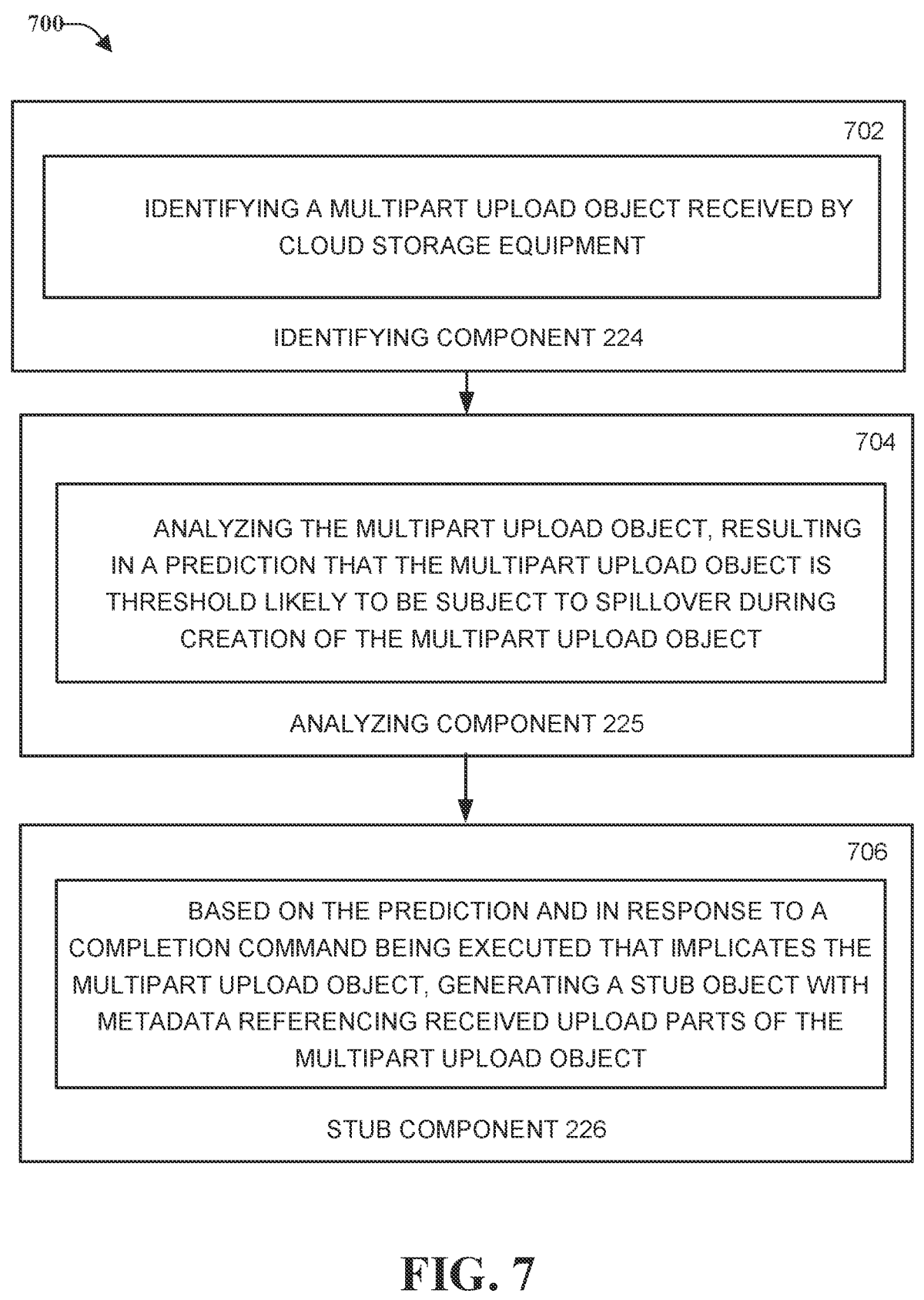

IDENTIFYING A MULTIPART UPLOAD OBJECT RECEIVED BY CLOUD STORAGE EQUIPMENT

IDENTIFYING COMPONENT 224

704

ANALYZING THE MULTIPART UPLOAD OBJECT, RESULTING IN A PREDICTION THAT THE MULTIPART UPLOAD OBJECT IS THRESHOLD LIKELY TO BE SUBJECT TO SPILLOVER DURING CREATION OF THE MULTIPART UPLOAD OBJECT

ANALYZING COMPONENT 225

706

BASED ON THE PREDICTION AND IN RESPONSE TO A COMPLETION COMMAND BEING EXECUTED THAT IMPLICATES THE MULTIPART UPLOAD OBJECT, GENERATING A STUB OBJECT WITH METADATA REFERENCING RECEIVED UPLOAD PARTS OF THE MULTIPART UPLOAD OBJECT

STUB COMPONENT 226

FIG. 7

800

OPERATION 802

RECEIVE A MULTIPART UPLOAD OBJECT

OPERATION 804

BASED ON THE MULTIPART UPLOAD OBJECT BEING PREDICTED TO BE SUBJECT TO SPILLOVER IN CONNECTION WITH COMPLETION OF THE RECEIVING OF THE MULTIPART UPLOAD OBJECT, IDENTIFY RECEIVED UPLOAD PARTS REFERENCED BY THE MULTIPART UPLOAD OBJECT

OPERATION 806

GENERATE A STUB OBJECT WITH METADATA REFERENCING THE RECEIVED UPLOAD PARTS OF THE MULTIPART UPLOAD OBJECT

NON-TRANSITORY MACHINE-READABLE MEDIUM 810

FIG. 8

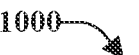
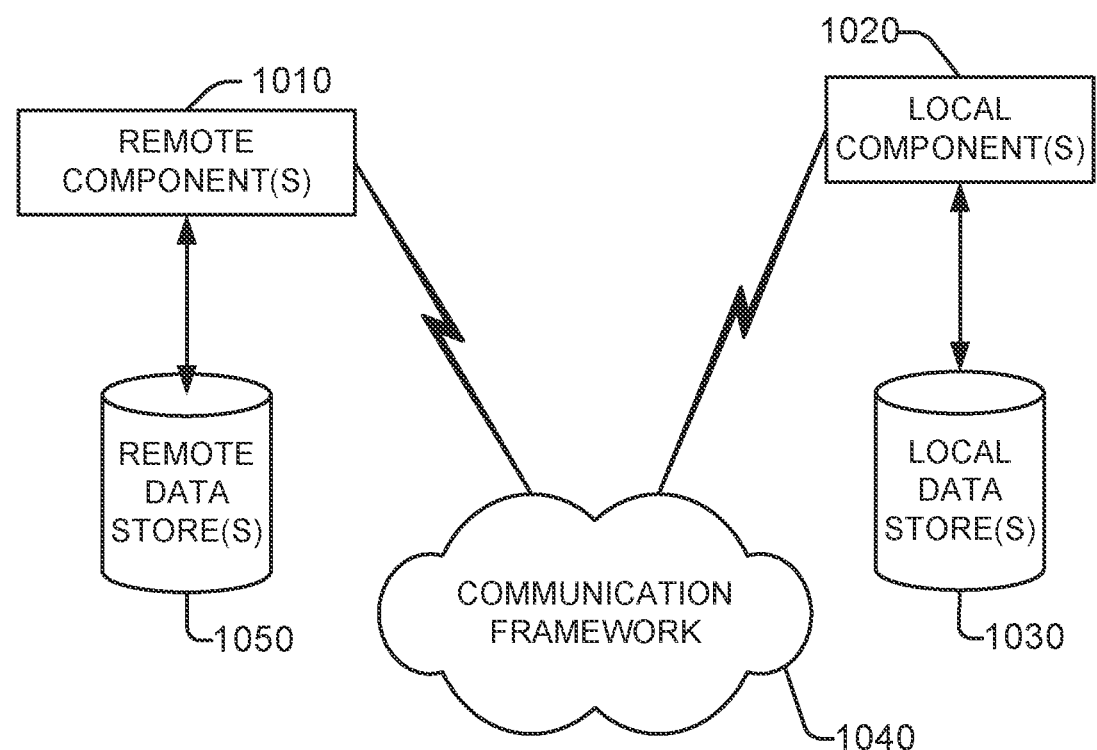
FIG. 10

GENERATING STUB OBJECTS WITH METADATA REFERENCING UPLOAD PARTS OF MULTI-PART UPLOAD OBJECT

BACKGROUND

In some implementations, a multi-part upload (MPU) describes a process by which a data object to be stored in an online object storage system can be uploaded in smaller, more manageable parts for uploading to the storage system. Once uploaded, in some implementations, a complete command for the MPU can be executed at the storage system to finalize and generate the stored data object from the uploaded parts. Because MPUs can be very large, executing the complete command can be an often prohibitively time consuming process.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can include a processor and a memory that stores executable instructions that, when executed by the processor, facilitate performance of operations. The instructions can include an instruction to identify a multipart upload object received by cloud storage equipment, analyze the multipart upload object, resulting in a prediction that the multipart upload object is threshold likely to be subject to spillover during creation of the multipart upload object, and based on the prediction and in response to a completion command being executed that implicates the multipart upload object, generate a stub object with metadata referencing received upload parts of the multipart upload object.

In additional or alternative embodiments of the system, the actions can further include, generating an index structure for the stub object based on an aggregation of respective key values of received upload parts of the multipart upload object. In additional or alternative embodiments, the aggregation of the respective key values of received upload parts of the multipart upload object can include shifting data ranges to be relative to the stub object.

An example method can include receiving a multipart upload object that can include references to upload parts. Further, the method can include, based on the multipart upload object being predicted to be subject to spillover during creation of the multipart upload object according to the upload parts, identifying the upload parts referenced by the multipart upload object, resulting in identified upload parts. The method can further include generating a stub object with metadata referencing the identified upload parts of the multipart upload object.

Additionally or alternatively, the method can further include, after generating the stub object, removing the multipart upload object. Additionally or alternatively, the method can further include, based on the multipart upload object being predicted to be subject to the spillover, postponing garbage collection of the received upload parts. In additional or alternative embodiments, the metadata can include an upload identifier of the multipart upload object. Additionally or alternatively, the method can further include, analyzing the multipart upload object, wherein the multipart upload object was predicted to be subject to the spillover based on the analyzing.

In additional or alternative embodiments, the multipart upload object was predicted to be subject to the spillover based on the analyzing indicating that a size of the multipart upload object implicates a size threshold. In additional or alternative embodiments, the metadata can reference the received upload parts based on respective key values of the received upload parts. Additionally or alternatively, the method can further include generating an index structure for the stub object based on an aggregation of the respective key values of the received upload parts. In additional or alternative embodiments, the aggregation of the respective key values of the key values received upload parts can include shifting data ranges to be relative to the stub object.

Additionally or alternatively, the method can further include, receiving a read object request corresponding to a first requested range of the stub object, and based on the index structure, responding to the first read object request with a first portion of the received upload parts corresponding to the first requested range. Additionally or alternatively, the method can further include, receiving a second read object request corresponding to a second requested range of the stub object, based on the metadata, identifying the respective key values of the received upload parts that correspond to the second requested range, resulting in identified key values, and responding to the second read object request with a second portion of the received upload parts corresponding to the identified key values.

An example non-transitory computer-readable medium can include instructions that, in response to execution, cause a system including a processor to perform operations. These operations can include receiving a multipart upload object, based on the multipart upload object being predicted to be subject to spillover in connection with completion of the receiving of the multipart upload object, identifying received upload parts referenced by the multipart upload object, and generating a stub object with metadata referencing the received upload parts of the multipart upload object.

In additional or alternative embodiments, the actions can further include, after generating the stub object, deleting the multipart upload object. In additional or alternative embodiments, the actions can further include, based on the multipart upload object being predicted to be subject to the spillover, postponing garbage collection of the received upload parts.

In additional or alternative embodiments, the metadata can include an upload identifier of the multipart upload object. In additional or alternative embodiments, the actions can further include, analyzing the multipart upload object, with the multipart upload object being predicted to be subject to the spillover based on the analyzing, and the multipart upload object being predicted to be subject to the spillover based on the analyzing indicating that a size of the multipart upload object implicates a first size threshold.

Other embodiments may become apparent from the following detailed description when taken in conjunction with the drawings.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 is an example of code that can be used to implement an example system that can facilitate generating a stub object with metadata referencing uploaded parts of a multipart upload object, in accordance with one or more embodiments.

FIG. 6 depicts a flow diagram representing example operations of an example method that can facilitate generating a stub object with metadata referencing uploaded parts of a multipart upload object, in accordance with one or more embodiments.

FIG. 7 depicts an example system that can facilitate controlling the generation of a stub object with metadata referencing uploaded parts of a multipart upload object, in accordance with one or more embodiments.

FIG. 8 depicts an example non-transitory machine-readable medium that can include executable instructions that, when executed by a processor of a system, can facilitate generating a stub object with metadata referencing uploaded parts of a multipart upload object, in accordance with one or more embodiments.

FIG. 10 depicts an example schematic block diagram of a computing environment with which the disclosed subject matter can interact, in accordance with one or more embodiments.

DETAILED DESCRIPTION

Figure 1:
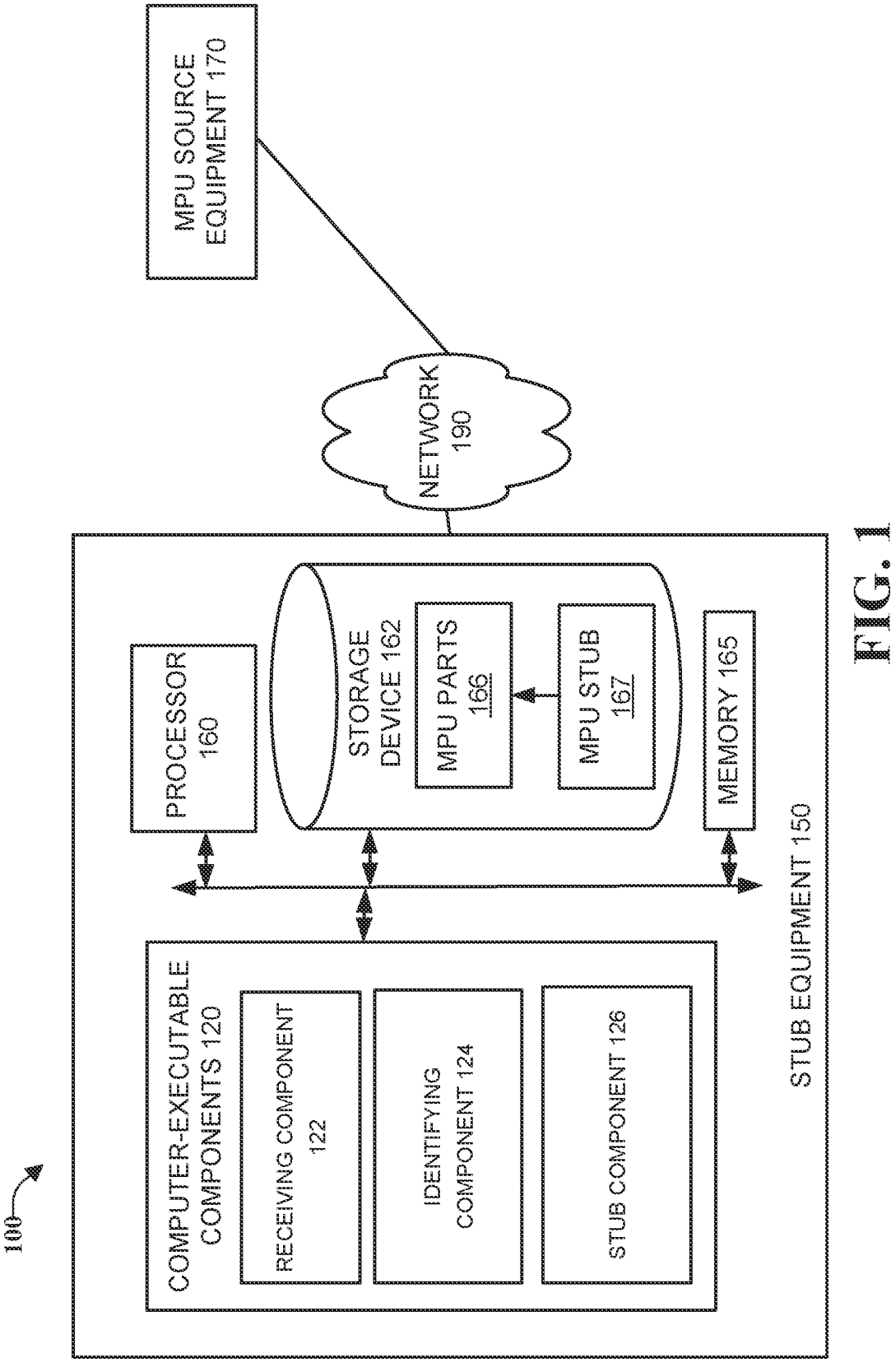
FIG. 1 is an architecture diagram of an example system that can facilitate generating a stub object with metadata referencing uploaded parts of a multipart upload object, in accordance with one or more embodiments.

Generally speaking, one or more embodiments described herein can facilitate generating a stub object with metadata referencing uploaded parts of a multipart upload object. As is understood by one having skill in the relevant art(s), given the description herein, the implementation(s) described herein are non-limiting examples, and variations to the technology can be implemented. For instance, even though many examples described herein discuss cloud storage devices, the technologies described herein can be used in many applicable circumstances, e.g., storing streams data with other types of data storage. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed.

Example embodiments of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

In one or more embodiments, a data object being constructed from an MPU can be determined to be of a type (e.g., based on large size) that should be created as an MPU stub. While one approach to a standard MPU complete command creates an object with all the appropriate data indices (DIs) relative to the object, in one or more embodiments, an MPU stub has no DIs, and instead has metadata that allows the MPU stub to reference the existing MPU part keys with DIs relative to uploaded MPU parts. One result that can be achieved from this approach is an avoidance of reading and writing any spillover chunks during the complete operation. In one or more embodiments, when using MPU stubs to handle MPU data objects, the performance and memory factor are the operations that load the parts from the key value store, which still can be performed for verifying the MPU complete request, and for finding the part sizes. Additional details are provided with the description of FIGS. 1-3 below.

Additional features of one or more embodiments can includes the enablement of performing a read object operation on a generated MPU stub, e.g., by finding which MPU Part keys to load, shifting their DIs to be relative to the object, and using the shifted DIs to satisfy the requested range of the read object operation. Additional details are provided with the description of FIG. 4 below.

Additional features of embodiments described herein include use of an internal index creation background process that can construct a permanent index structure for the MPU stub, e.g., with the DIs from the used MPU parts being shifted to be relative to the data object. Once this permanent index structure is generated, reads on the stub object are via the index keys, e.g., because MPU part keys are not used for data read operations, these MPU part keys can be removed. Additional details are provided with the description of FIG. 3 below.

FIG. 1 is an architecture diagram of an example system 100 that can facilitate generating a stub object with metadata referencing uploaded parts of a multipart upload object, in accordance with one or more embodiments. For purposes of brevity, description of like elements and/or processes employed in other embodiments is omitted. As depicted, system 100 includes stub equipment 150 connected to MPU source equipment 170 and controller equipment 180 via network 190.

As depicted, stub equipment 150 includes memory 165, processor 160, and storage device 162. According to multiple embodiments, memory 165 of stub equipment 150 can store one or more computer and/or machine readable, writable, and/or executable components 120 and/or instructions. In one or more embodiments, computer-executable components 120, when executed by processor 160, can facilitate performance of operations defined by the executable component(s) and/or instruction(s). Computer executable components 120 can include receiving component 122, identifying component 124, stub component 126, and other components described or suggested by different embodiments described herein, that can improve the operation of system 100 or other systems described herein.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 190 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure. In some embodiments, memory 165 can comprise non-volatile random-access memory (NVRAM).

It is understood that the computer processing systems, computer-implemented methods, apparatus, and computer program products described herein employ computer hardware and/or software to solve problems that are highly technical in nature (e.g., utilizing cloud storage protocols to store potentially large, multi-part data uploads), that are not abstract and cannot be performed as a set of mental acts by a human. For example, a human, or even a plurality of humans, cannot efficiently handle the complex, rapid storage and referencing of large amount of data according to cloud storage provider specifications or requirements.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of receiving component 122, which can in some implementations perform a method that includes receiving a multipart upload object comprising references to upload parts. For example, one or more embodiments, receiving component 122 can receive a multipart upload object from MPU source equipment 170 that includes references to MPU parts 166 stored in storage device 162 of stub equipment 150.

In another example, memory 165 can store executable instructions that can facilitate generation of identifying component 124, which can, in some implementations perform a method that further includes, based on the multipart upload object being predicted to be subject to spillover during creation of the multipart upload object according to the upload parts, identifying the upload parts referenced by the multipart upload object, resulting in identified upload parts. For example, one or more embodiments, identifying component 124 can, based on the multipart upload object being predicted to be subject to spillover during creation of the multipart upload object according to the upload parts, identify the upload parts referenced by the multipart upload object, resulting in identified upload parts. For example, one or more embodiments identifying component 124 can, based on the multipart upload object being predicted to be subject to spillover during creation of the multipart upload object according to the upload parts, identify MPU parts 166, resulting in identified upload parts.

In another example, memory 165 can store executable instructions that can facilitate generation of stub component 126, which can, in some implementations perform a method that further includes, generating a stub object with metadata referencing the identified upload parts of the multipart upload object. For example, one or more embodiments, stub component 126 can generate MPU stub 167 with metadata referencing the identified MPU parts 166 of the multipart upload object.

It is appreciated that the embodiments of the subject disclosure depicted in various figures disclosed herein are for illustration only, and as such, the architecture of such embodiments are not limited to the systems, devices, and/or components depicted therein. For example, in some embodiments, stub equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

It should be noted that stub equipment 150, and other equipment discussed herein, can execute code instructions that may operate on servers or systems, remote data centers, or 'on-box' in individual client information handling systems, according to various embodiments herein. In some embodiments, it is understood any or all implementations of one or more embodiments described herein can operate on a plurality of computers, collectively referred to as stub equipment 150. For example, one or more of stub equipment 150, and other equipment discussed herein can all be separate subsystems running in the kernel of a computing device as well as operating on separate network equipment, e.g., as depicted in FIG. 1.

As noted above, one or more embodiments can facilitate the creation of a permanent index structure for the MPU stubs such that the part key values (KVs) of the uploaded parts referenced by the MPU stub can be removed. Based on this approach, one or more embodiments can enable MPU stub objects to be accessed by the system like other large objects, e.g., without the use of MPU logic described herein, and without the need for spillover read operations.

As discussed below, in one or more embodiments, a data index (DI), can be a pointer to the location of an uploaded data part, along with a data range which can contain a logical offset and length of data from the source entity. A spillover definition can be a key value (KV) pair that indicates that an entity has a limited size, e.g., maxKvSize. In an example, when the size (KV)>maxKvSize then a portion of a KV can be shifted to one or more spillover chunks such that the remaining size of the KV, with DIs pointing to the spillover chunks, is now smaller than maxKvSize. As discussed above, this shifting can be associated with disk reads and writes and other extra overhead.

It should be noted that, the approach to completing an MPU object described above can avoid the complete command finishing in a period of time that is proportional to the size of the combined parts of the MPU object. For example, when an MPU has N parts ($p_i$ s.t. i∈[1, N]) where each has a size S, and each data index (DI) can reference L bytes of data, the following functions can describe one or more example embodiments:

$$NumberOfDIs(\text{Size}) = \frac{\text{Size}}{L}$$

$$objectSize = \sum_{i=0}^{i=N} \text{Size}(p_i) = N * S$$

If (BytesPerDI*NumberOfDIs(size($p_n$)))>maxKvSize than a Disk Read (DR) may be needed.

Disk Writes (DW) may be needed if the following is true:

$$VersionKVSize \cong BytesPerDi * NumberOfDIs(objectSize) =$$

$$BytesPerDi * \frac{(N * S)}{L} > \text{max}KvSize$$

Furthermore, if spillover chunk can store K DIs then:

$$NumberOfSpillover(\text{Size}) \cong \frac{NumOfDIs(\text{Size})}{K} = \frac{\text{Size}}{K * L} \propto \text{Size}$$

$$TimeToLoadParts(N) = \alpha * N \propto N$$

Where $\alpha$ is the time to load each MPU Part key from the key value store.

Based on the above example formulas, the following formula can be determined:

$$CompleteTime \cong$$

$$TimeToLoadParts + TimeToLoadDIs + TimeToWriteSpillover \cong$$

$$(\alpha * N) + \left(\sum_{i=1}^{N} NumberOfSpillovers(\text{Size}(Pi)) * DR\right) +$$

$$\left(\sum_{i=1}^{N} NumOfDIs(\text{Size}(P_i)) * DW\right) \cong$$

$$(\alpha * N) + (N * S * DR) + (N * S * DW) = (\alpha * N) + (N * S)(DR + DW)$$

In the example CompleteTime function described above, one factor that can influence the result is the time to read and write spillover chunks which makes the time proportional to the number of parts, N, and the size of each part, S. In some circumstances, spillover reads and writes are not needed, then the time for completion can be proportional to only N. Furthermore, a DR since time needed to read from key value store may be able to be reduced from cache hits, while disk reads cannot be cached.

Thus, by avoiding spillover reads and writes during a complete MPU command, then one or more embodiments can result in the completion time being proportional to just the part count, which is bounded by a constant, e.g., the entire complete operation can be bounded. Stated differently, in some implementations, the generation of MPU stub 167 that references uploaded MPU parts 166 can be performed in a bounded and predictable time proportional to the number of MPU parts that are referenced MPU stub 167, e.g., by avoiding disk reads and writes used to store the content of MPU parts 166. In addition, as discussed further with FIGS. 3-4 below, the resulting stub object should be usable from foreground and background processes without potential memory or time concerns.

Example data storage systems which can employ one or more of the approaches described with embodiments herein include, but are not limited to, OBJECTSCALE® and DELL ECS®, a non-limiting example enterprise object storage architecture provided by DELL EMC, Inc.

Figure 2:
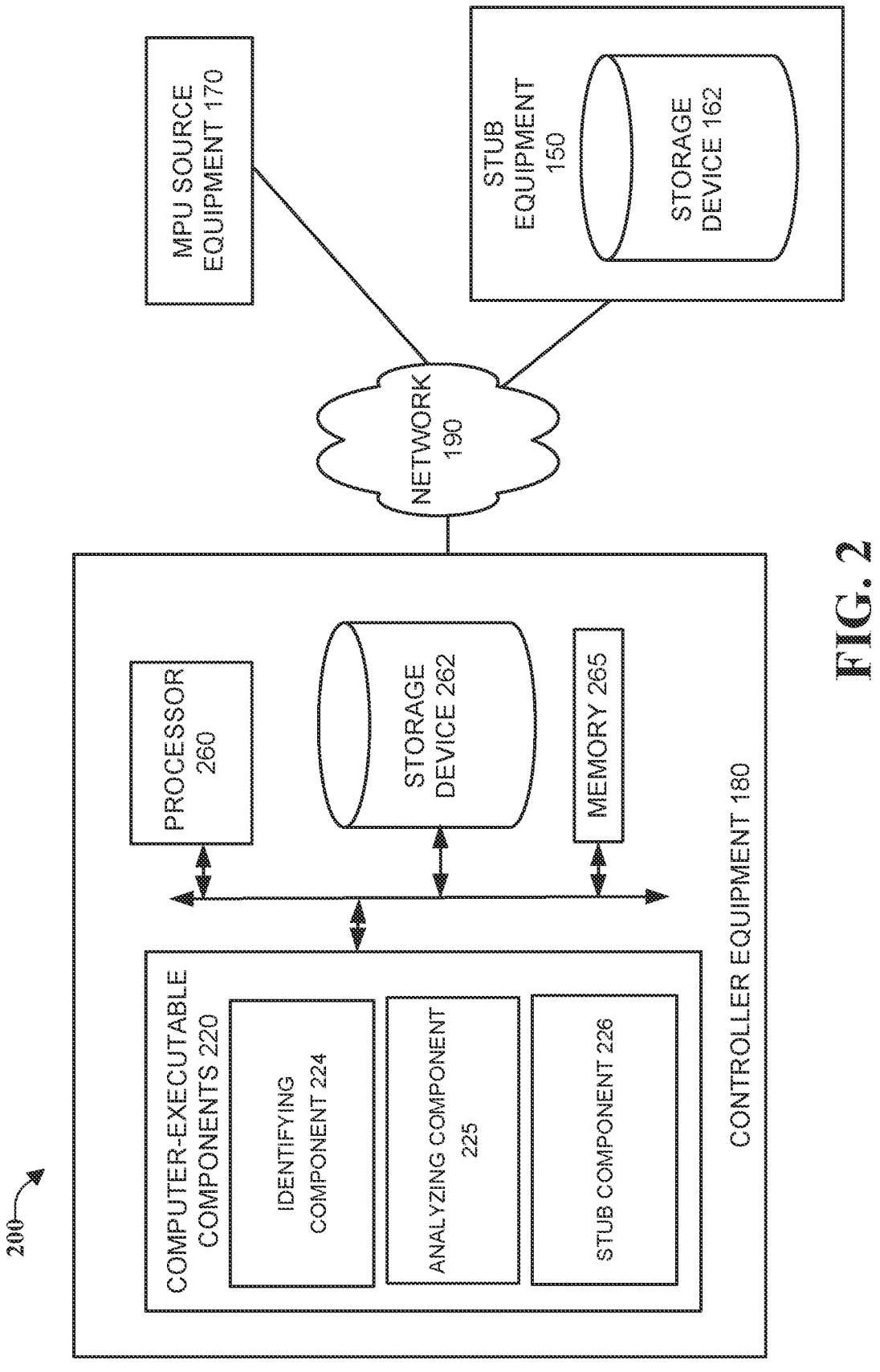
FIG. 2 is an architecture diagram of an example system that can facilitate using a controller to manage generating a stub object with metadata referencing uploaded parts of a multipart upload object, in accordance with one or more embodiments.

FIG. 2 is an architecture diagram of an example system 200 that can facilitate using a controller to manage generating a stub object with metadata referencing uploaded parts of a multipart upload object, in accordance with one or more embodiments. For purposes of brevity, description of like elements and/or processes employed in other embodiments is omitted. As depicted, system 200 includes controller equipment 180 connected to MPU source equipment 170 and stub equipment 150 via network 190.

As depicted, controller equipment 180 can include processor 260 (e.g., similar to processor 160) and storage device 262 (e.g., similar to storage device 162 with journal 187). According to multiple embodiments, controller equipment 180 can further include memory 265 (similar to memory 165) that can store one or more computer and/or machine readable, writable, and/or executable components 220 and/or instructions that, when executed by processor 260, can facilitate performance of operations defined by the executable component(s) and/or instruction(s). According to multiple embodiments, memory 265 can store one or more computer and/or machine readable, writable, and/or executable components 220 and/or instructions, which can, when executed by processor 260, facilitate performance of operations defined by the executable components, including identifying component 224, analyzing component 225, stub component 226, and other components described or suggested by different embodiments described herein, that can facilitate and improve the operation of system 200.

In one or more embodiments, computer executable components 220 can be used in connection with implementing one or more of the systems, devices, components, and/or computer-implemented operations shown and described in connection with FIG. 2 or other figures disclosed herein. In an example implementation of controller equipment 180, memory 265 can store executable instructions that can facilitate generation of identifying component 224, which in some implementations, can perform actions that include identifying a multipart upload object received by cloud storage equipment. For example, in one or more embodiments, identifying component 224 can identify a multipart upload object received by stub equipment 150 and stored in storage device 162.

In an additional example implementation of controller equipment 180, memory 265 can store executable instructions that can facilitate generation of analyzing component 225, which in some implementations, can perform actions that include analyzing the multipart upload object, resulting in a prediction that the multipart upload object is threshold likely to be subject to spillover during creation of the multipart upload object. For example, in one or more embodiments, analyzing component 225 can analyze the multipart upload object at stub equipment 150, resulting in a prediction that the multipart upload object is threshold likely to be subject to spillover during creation of the multipart upload object.

In an additional example implementation of controller equipment 180, memory 265 can store executable instructions that can facilitate generation of stub component 226, which in some implementations, can perform actions that include, based on the prediction and in response to a completion command being executed that implicates the multipart upload object, generating a stub object with metadata referencing received upload parts of the multipart upload object. For example, in one or more embodiments, stub component 226 can, based on the prediction and in response to a completion command being executed that implicates the multipart upload object, generate MPU stub 167 object with metadata referencing received MPU parts 166 of the multipart upload object.

Figure 3:
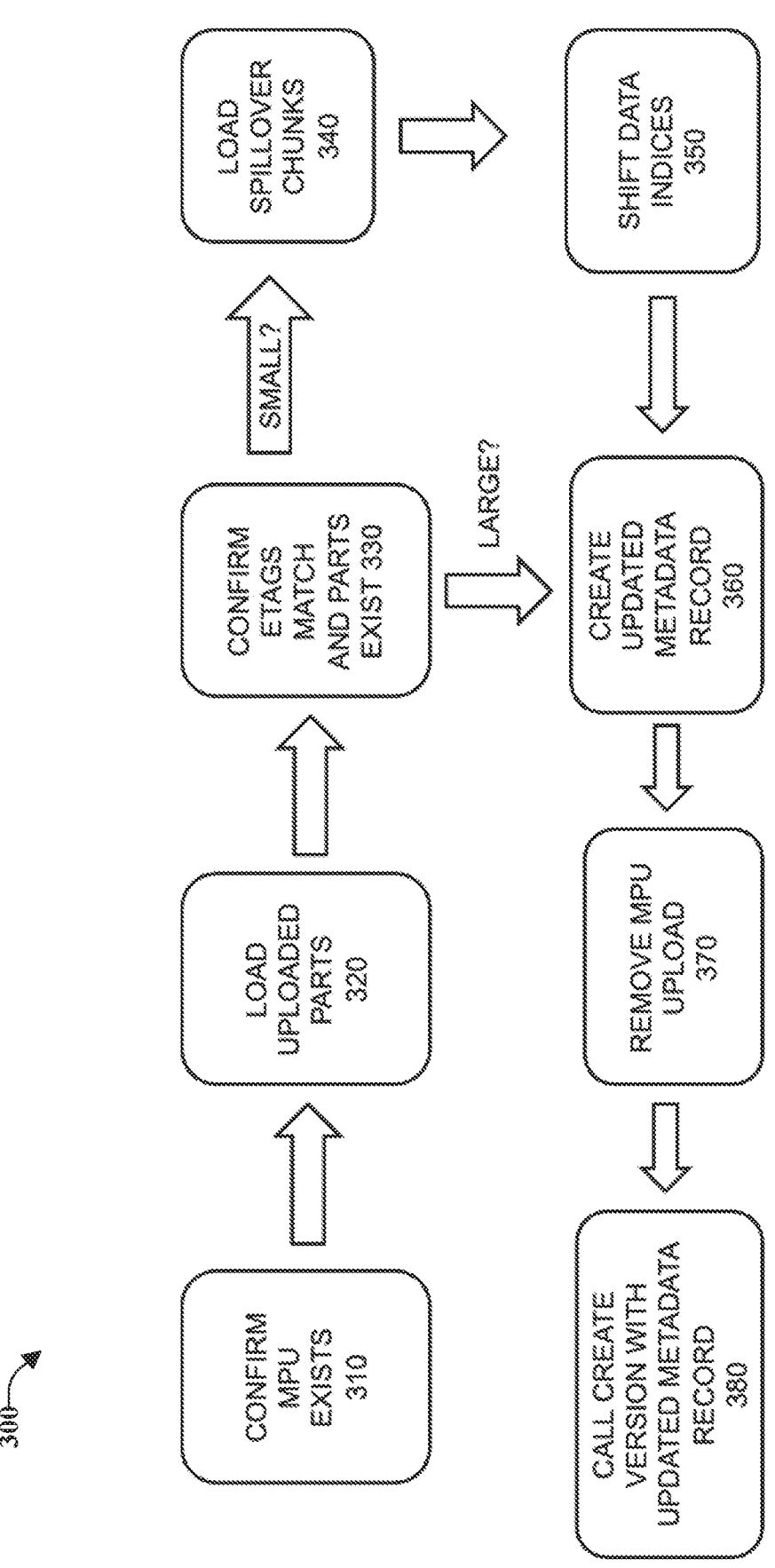
FIG. 3 is a flow diagram of an example system that can facilitate generating a stub object with metadata referencing uploaded parts of a multipart upload object, in accordance with one or more embodiments.

FIG. 3 is a flow diagram of an example system 300 that can facilitate generating a stub object with metadata referencing uploaded parts of a multipart upload object, in accordance with one or more embodiments. For purposes of brevity, description of like elements and/or processes employed in other embodiments is omitted. As depicted, system 300 includes blocks 310-380, discussed in detail below.

For example, at 310, one or more embodiments can confirm the MPU upload parts have been uploaded. Continuing the example, at 320, one or more embodiments can load uploaded parts. Continuing the example, at 330, one or more embodiments can confirm hash values (entity tags or Etags) used to verify the integrity of each uploaded part of a file, in some implementations, an MPU part can be assigned an Etag after the part has been successfully uploaded.

As depicted in example system 300, at this point, a prediction can be made as to whether the completion of the MPU with the uploaded parts of 320 is going to result in a spillover data processing event. One approach that can be used by some embodiments to make this prediction is the aggregated size of the uploaded parts. In this example, a threshold size can be selected based on the system processing capabilities, and if this threshold is exceeded (e.g., "Large" in the diagram), then processing of the MPU completion moves to 360, discussed below. Alternatively, when the threshold is not exceeded (e.g., "large" in the diagram), processing moves to block 340.

Continuing the example, at 340, one or more embodiments can load spillover chunks and process the MPU completion with a predicted time that corresponds to the aggregated size of the uploaded parts of 320. In this approach that can be utilized for the completion of smaller MPUs, the complete request can cause a specific ordered set of already uploaded parts (PartNumber and associated Etag pairs) to be verified and then concatenated together to form a new stored data object. In this example, the MPU and its parts are to become no longer visible and become garbage collected after a successful CompleteMPU command.

Continuing the example, at 350, one or more embodiments where a stub is not created can shift data indices, e.g., by loading the DIs from uploaded parts and shifting the data ranges of the DIs to be relative to the resulting object. In this operation, the reading of DIs from a part involves disk reads if the part had spillover, e.g., a objects KV of an object involving one or more spillover chunks to be created.

Continuing the example, at 360, one or more embodiments can create updated metadata record. At this operation, a determination can be made as to whether a stub or a non-stub MPU is to be created. Continuing the example, at 370, one or more embodiments can remove MPU upload. Continuing the example, at 380, one or more embodiments can call a create version command with the updated metadata record created at 360. In this example, a complete MPU for large object now can create an MPU stub version, e.g., the includes metadata that references back to the uploaded MPU parts that have the data. During this processing, index creation can be performed in the background to make indices for all the DIs. Once index creation is complete, as noted in 360 above, the MPU parts can be cleaned up (e.g., removed). In this example, after index creation, an MPU stub and non-stub large object can be handled equivalently by different system operations.

It should be noted that, in one or more embodiments, space reclamation (e.g., 'garbage collection' (GC) processes can be altered (e.g., postponed) such that MPU parts are not removed, e.g., so as to be referenced by the generated MPU stub and facilitate a permanent index reference being created for the MPU. Once this permanent index structure has been generated, the postponed GC processes may be commenced. In addition, when replicating large, stored data objects, one or more embodiments can generate a stub to reference the replicated object version, e.g., for implementations that had replications size limits (such as 5 TB), these systems can replicate example objects including data objects with 30 TB size.

Figure 4:
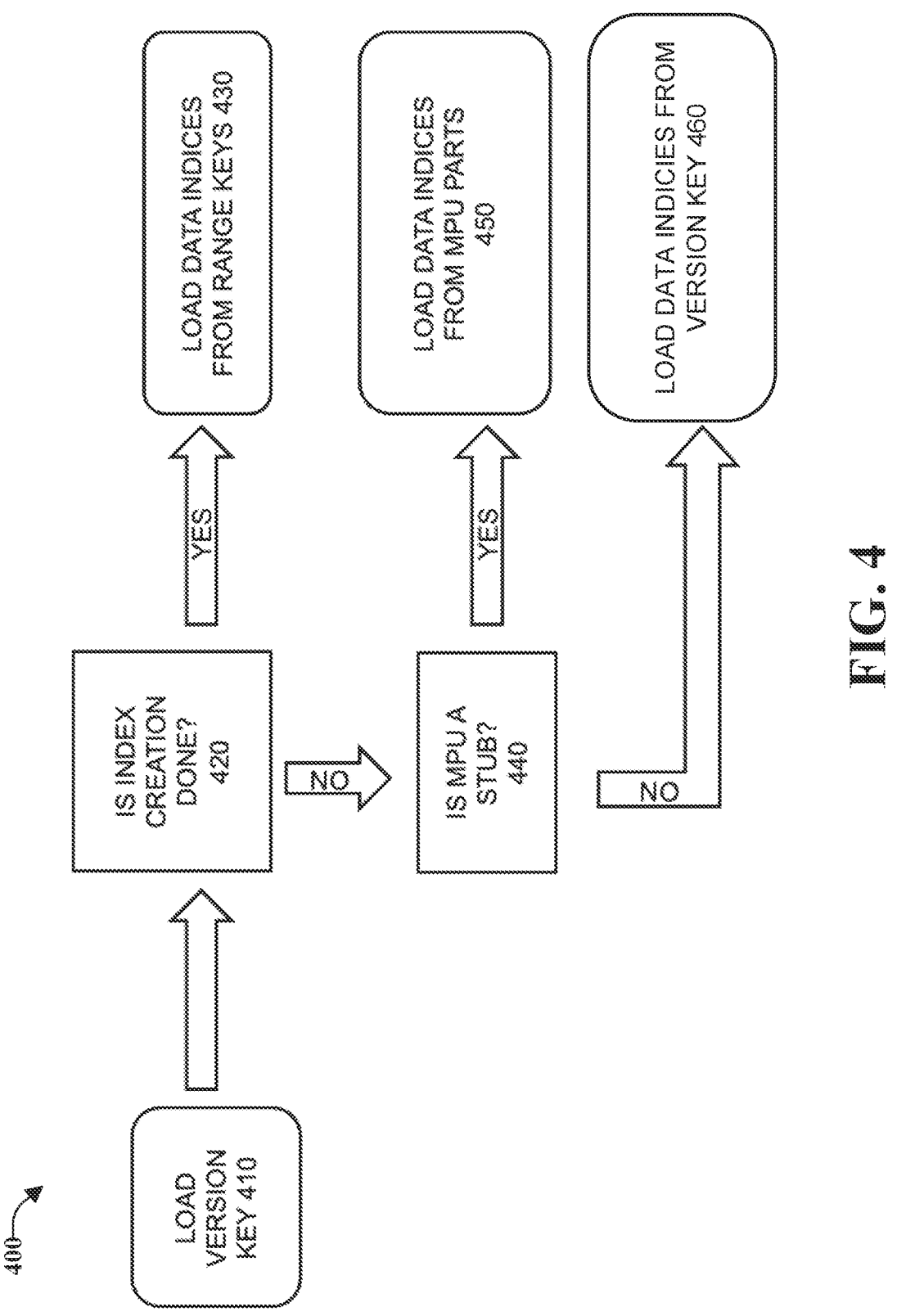
FIG. 4 is a flow diagram of an example system that can facilitate perform a data read operation on index KVs associated with a stub object, in accordance with one or more embodiments.

FIG. 4 is a flow diagram of an example system 400 that can facilitate perform a data read operation on index KVs associated with a stub object, in accordance with one or more embodiments. For purposes of brevity, description of like elements and/or processes employed in other embodiments is omitted.

At 410, a version key for the MPU can loaded, and at 420 a check can be performed to determine whether indexing of the MPU has been completed. When the indexing has been completed, at 430, DIs from range keys can be loaded for enabling a read operation of the data object created from the MPU, e.g., whether the data object was created as a stub or a non-stub, the system can read the contents of the data object using the same processes. Stated differently, once permanent index KVs are created from the part KVs, then a flag can be set on the object indicating it is complete, e.g., data read operations after this point read from index KVs and no longer from part KVs such as is described with 450 below.

In one or more embodiments, once a permanent index structure referencing the uploaded MPU has been constructed, the stub object may be updated to indicate the index structure has been created, and that the postponing of the GC of the parts has stopped. It should be noted that one aspect of this approach (e.g., reading from the permanent index structure) can facilitate the reading from spillover chunks that could otherwise occur without the use of one or more embodiments. It should be noted that the permanent index structure generated by one or more embodiments can be indistinguishable from another large data object, and that once the permanent index structure has been completed, the temporary part structure may be removed, e.g., by GC processes.

Before index creation has been completed, at 440, when the data object is referenced from an MPU stub, at 450, the DIs from the uploaded parts referenced by the metadata of the MPU stub can be loaded and used to enable the data read operation. Alternatively, when the MPU without a completed index is not referenced as a stub, at 460, DIs can be loaded to enable the data read operation from the version key.

In an example implementation, one or more embodiments can receive a read object request corresponding to a first requested range of a stub object, and based on the index structure, can respond to the first read object request with a first portion of the received upload parts corresponding to the first requested range. Additionally or alternatively, one or more embodiments can receive a second read object request corresponding to a second requested range of the stub object, and can, based on the metadata, identify the respective key values of the received upload parts that correspond to the second requested range, thereby resulting in identified key values. Based on these key values, one or more embodiments can respond to the second read object request with a second portion of the received upload parts corresponding to the identified key values.

FIG. 5 is an example 500 of code that can be used to implement an example system that can facilitate generating a stub object with metadata referencing uploaded parts of a multipart upload object, in accordance with one or more embodiments. For purposes of brevity, description of like elements and/or processes employed in other embodiments is omitted. As depicted, system 500 includes code 510.

In this example, given a DataRange of [N,M] where N is the start offset and M is the end offset, the parts and starting offset for the can be determined, e.g., resulting in a triplet (startingOffset, startingPartNumber, endingPartNumber). In this example, the shift of the DIs can be determined based on the triplet and the following example functions:

$$\forall\ PartNum \in [startingPartNum, endingPartNum]:$$

$$Shift(partNum, startingOffset, startingPartNum) =$$

$$startingOffset + \sum_{i=startingPartNum}^{partNum} size(P_i)$$

FIG. 6 depicts a flow diagram representing example operations of an example method 600 that can facilitate generating a stub object with metadata referencing uploaded parts of a multipart upload object, in accordance with one or more embodiments. For purposes of brevity, description of like elements and/or processes employed in other embodiments is omitted.

In some examples, one or more embodiments of method 600 can be implemented by receiving component 122, identifying component 124, stub component 126, and other components that can be used to implement method 600, in accordance with one or more embodiments. It is appreciated that the operating procedures of method 600 are example operating procedures, and that there can be embodiments that implement more or fewer operating procedures than are depicted, or that implement the depicted operating procedures in a different order than as depicted.

At 602 of method 600, receiving component 122 can, in one or more embodiments receiving a multipart upload object comprising references to upload parts. At 604 of method 600, identifying component 124 can, in one or more embodiments based on the multipart upload object being predicted to be subject to spillover during creation of the multipart upload object according to the upload parts, identifying the upload parts referenced by the multipart upload object, resulting in identified upload parts. At 606 of method 600, stub component 126 can, in one or more embodiments generate a stub object with metadata referencing the identified upload parts of the multipart upload object.

FIG. 7 depicts an example system 700 that can facilitate controlling the generation of a stub object with metadata referencing uploaded parts of a multipart upload object, in accordance with one or more embodiments. For purposes of brevity, description of like elements and/or processes employed in other embodiments is omitted. Example system 700 can include receiving component 122, identifying component 124, stub component 126, and other components that can be used to implement system 700, as described herein, in accordance with one or more embodiments.

At 702 of FIG. 7, identifying component 224 can identify a multipart upload object received by cloud storage equipment, in accordance with one or more embodiments. At 704 of FIG. 7, analyzing component 225 can analyze the multipart upload object, resulting in a prediction that the multipart upload object is threshold likely to be subject to spillover during creation of the multipart upload object. At 706 of FIG. 7, stub component 226 can, based on the prediction and in response to a completion command being executed that implicates the multipart upload object, generate a stub object with metadata referencing received upload parts of the multipart upload object.

FIG. 8 depicts an example 800 non-transitory machine-readable medium 810 that can include executable instructions that, when executed by a processor of a system, can facilitate generating a stub object with metadata referencing uploaded parts of a multipart upload object, in accordance with one or more embodiments. For purposes of brevity, description of like elements and/or processes employed in other embodiments is omitted.

Operation 802 of FIG. 8 can facilitate execution of instructions that can generate receiving component 122 which, in one or more embodiments, can receive a multipart upload object. Operation 804 of FIG. 8 can facilitate execution of instructions that can generate identifying component 124, which, in one or more embodiments can, based on the multipart upload object being predicted to be subject to spillover in connection with completion of the receiving of the multipart upload object, identify received upload parts referenced by the multipart upload object. Operation 806 of FIG. 8 can facilitate execution of instructions that can stub component 126 which, in one or more embodiments, can generate a stub object with metadata referencing the received upload parts of the multipart upload object.

Figure 9:
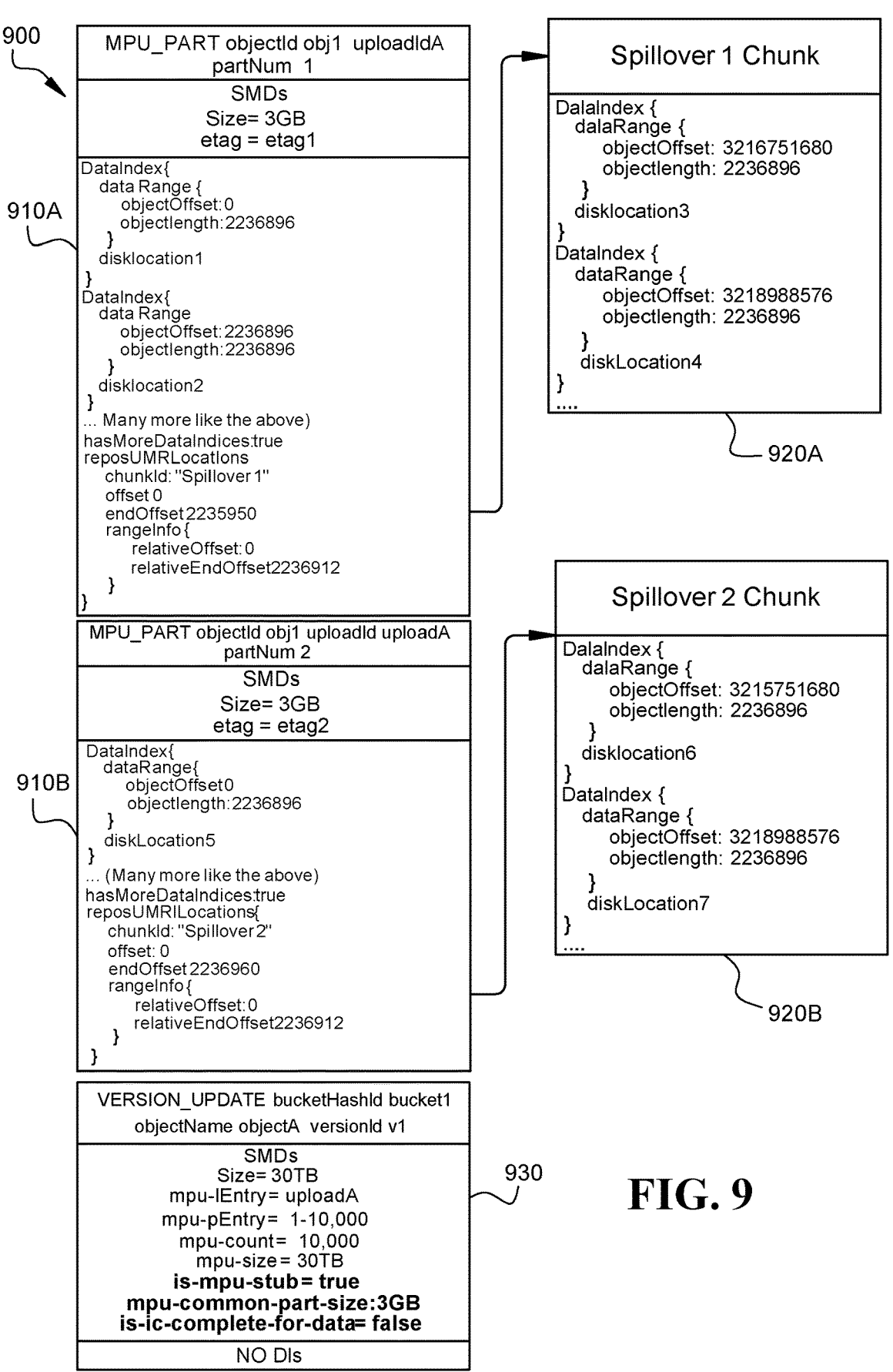
FIG. 9 depicts an entity relationship diagram of a system for generating a stub object with metadata referencing uploaded parts of a multipart upload object, in accordance with one or more embodiments.

FIG. 9 depicts an entity relationship diagram of a system for generating a stub object with metadata referencing uploaded parts of a multipart upload object, in accordance with one or more embodiments. Entities depicted include data indices 910A-B, spillover chunks 920A-B, and MPU stub 930.

FIG. 10 is a schematic block diagram of a system 1000 with which the disclosed subject matter can interact, in accordance with one or more embodiments. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices).

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

In order to provide a context for the various example embodiments of the disclosed subject matter, the following discussion is intended to provide a brief, general description of a suitable environment in which the various example embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020, non-volatile memory 1022, disk storage 1024, and memory storage, e.g., local data store(s) 1030 and remote data store(s) 1050, for which further description is set forth below.

For instance, non-volatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated embodiments can also be practiced in distributed computing environments where tasks are performed by remote processing devices that are linked through a communications network; however, some or all of the subject disclosure can be practiced on stand-alone computers. In a distributed computing environment, program modules can be located in both local and remote memory storage devices.

Figure 11:
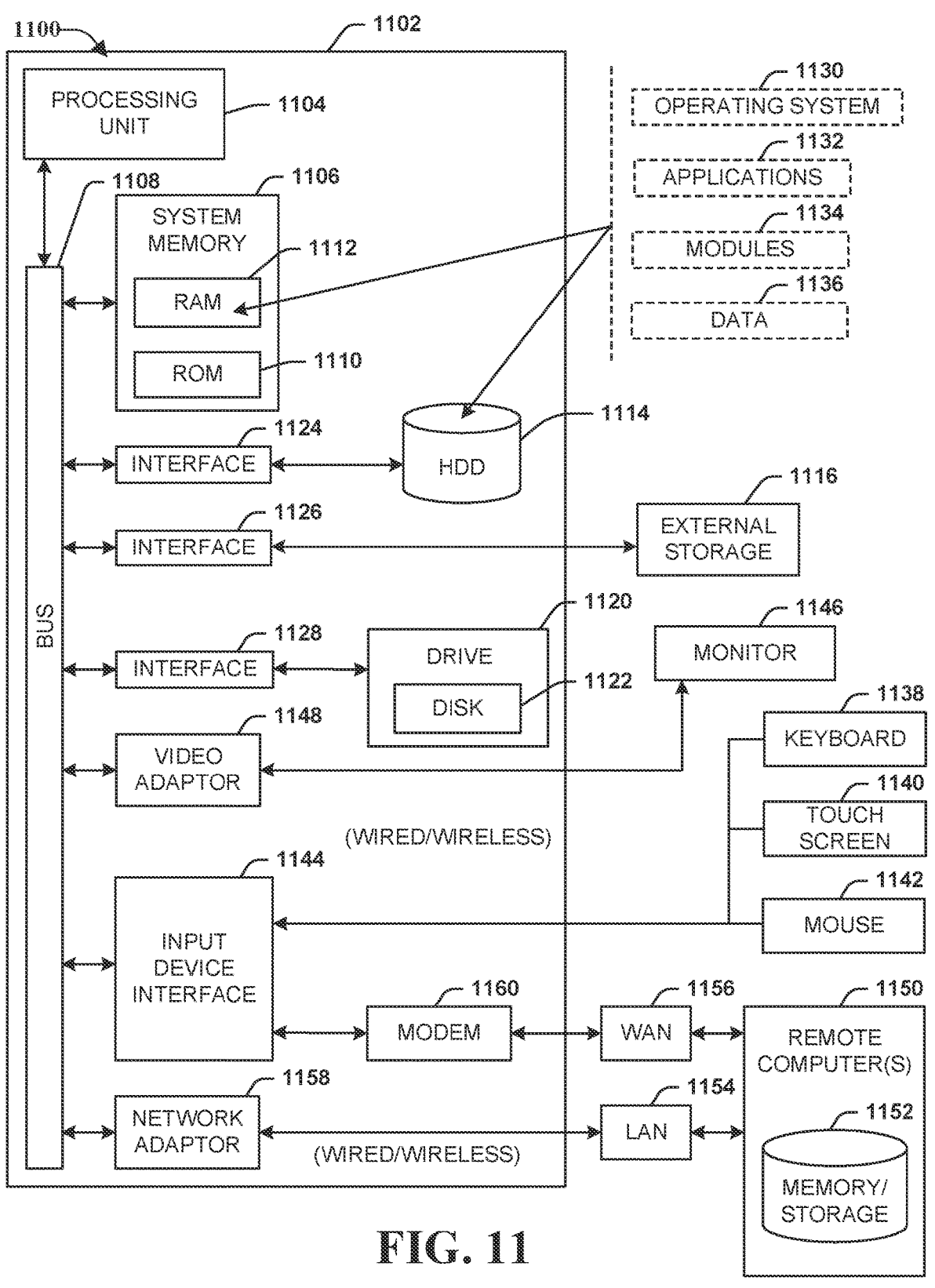
FIG. 11 illustrates an example block diagram of a computer operable to execute an embodiment of this disclosure.

Referring now to FIG. 11, in order to provide additional context for various embodiments described herein, FIG. 11 and the following discussion are intended to provide a brief, general description of a suitable computing environment 1100 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and non-volatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide non-volatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. As mentioned above, it will be appreciated that the memory components, or computer-readable storage media, described herein can be either volatile memory or non-volatile storage, or can include both volatile and non-volatile storage. By way of illustration, and not limitation, non-volatile storage can include ROM, programmable ROM (PROM), EPROM, EEPROM, or flash memory. Volatile memory can include RAM, which acts as external cache memory. By way of illustration and not limitation, RAM can be available in many forms such as SRAM, dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising
  receiving, by a system comprising at least one processor, a multipart upload object comprising references to upload parts;

based on the multipart upload object being predicted to be subject to spillover during creation of the multipart upload object according to the upload parts, identifying, by the system, the upload parts referenced by the multipart upload object, resulting in identified upload parts;
  generating, by the system, a stub object with metadata referencing the identified upload parts of the multipart upload object, wherein the metadata references the identified upload parts based on respective upload identifier values of the identified upload parts;
  generating, by the system, an index structure for the stub object based on an aggregation of the respective key values of the identified upload parts;
  receiving, by the system, a first read object request corresponding to a first requested range of the stub object; and
  based on the index structure, responding, by the system, to the first read object request with a first portion of the identified upload parts corresponding to the first requested range.

2. The method of claim 1, further comprising, after generating the stub object, removing, by the system, the multipart upload object.

3. The method of claim 1, further comprising, based on the multipart upload object being predicted to be subject to the spillover, postponing, by the system, garbage collection of the identified upload parts.

4. The method of claim 1, wherein the metadata comprises an upload identifier of the multipart upload object.

5. The method of claim 1, further comprising, analyzing, by the system, the multipart upload object, wherein the multipart upload object was predicted to be subject to the spillover based on the analyzing.

6. The method of claim 5, wherein the multipart upload object was predicted to be subject to the spillover based on the analyzing indicating that a size of the multipart upload object implicates a size threshold.

7. The method of claim 1, wherein the aggregation of the respective key values comprises shifting data ranges to be relative to the stub object.

8. The method of claim 1, further comprising:
  receiving, by the system, a second read object request corresponding to a second requested range of the stub object;
  based on the metadata, identifying, by the system, the respective key values of the identified upload parts that correspond to the second requested range, resulting in identified key values; and
  responding, by the system, to the second read object request with a second portion of the identified upload parts corresponding to the identified key values.

9. The method of claim 1, further comprising:
  after the generating of the stub object, deleting, by the system, the multipart upload object.

10. Controller equipment, comprising:
  at least one processing unit; and
  at least one memory coupled to the at least one processing unit and storing instructions configured to be executed by the at least one processing unit, wherein the instructions, when executed by the at least one processing unit, cause the controller equipment to perform actions comprising:
    identifying a multipart upload object received by cloud storage equipment,
    analyzing the multipart upload object, resulting in a prediction that the multipart upload object is threshold likely to be subject to spillover during creation of the multipart upload object, based on the prediction and in response to a completion command being executed that implicates the multipart upload object, generating a stub object with metadata referencing received upload parts of the multipart upload object, generating an index structure for the stub object based on an aggregation of respective key values of the received upload parts of the multipart upload object, receiving a read object request corresponding to a requested range of the stub object, and based on the index structure, responding to the read object request with a portion of the received upload parts corresponding to the requested range.

11. The controller equipment of claim 10, wherein the aggregation of the respective key values of the received upload parts of the multipart upload object comprises shifting data ranges to be relative to the stub object.

12. The controller equipment of claim 10, wherein the multipart upload object was predicted to be subject to the spillover based on the analyzing indicating that a size of the multipart upload object implicates a size threshold.

13. The controller equipment of claim 10, wherein the operations further comprise, based on the multipart upload object being predicted to be subject to the spillover, postponing garbage collection of the received upload parts.

14. The controller equipment of claim 10, further comprising:

after the generating of the stub object, deleting the multipart upload object.

15. A non-transitory machine-readable medium comprising executable instructions that, when executed by at least one processor, facilitate performance of operations, the operations, comprising:

receiving a multipart upload object;

based on the multipart upload object being predicted to be subject to spillover in connection with completion of the receiving of the multipart upload object, identifying received upload parts referenced by the multipart upload object;

generating a stub object with metadata referencing the received upload parts of the multipart upload object, wherein the metadata references the received upload parts based on respective upload identifier values of the received upload parts;

generating an index structure for the stub object based on an aggregation of the respective key values of the received upload parts;

receiving a read object request corresponding to a requested range of the stub object; and based on the index structure, responding to the read object request with a portion of the received upload parts corresponding to the requested range.

16. The non-transitory machine-readable medium of claim 15, wherein the operations further comprise, after the generating of the stub object, deleting the multipart upload object.

17. The non-transitory machine-readable medium of claim 15, wherein the operations further comprise, based on the multipart upload object being predicted to be subject to the spillover, postponing garbage collection of the received upload parts.

18. The non-transitory machine-readable medium of claim 15, wherein the metadata comprises an upload identifier of the multipart upload object.

19. The non-transitory machine-readable medium of claim 15, wherein the operations further comprise:

analyzing the multipart upload object, wherein the multipart upload object was predicted to be subject to the spillover based on the analyzing, and wherein the multipart upload object was predicted to be subject to the spillover based on the analyzing indicating that a size of the multipart upload object implicates a first size threshold.

20. The non-transitory machine-readable medium of claim 15, wherein the aggregation of the respective key values of the received upload parts of the multipart upload object comprises shifting data ranges to be relative to the stub object.

\* \* \* \* \*